Dec. 6, 1960  R. SOLLICH  2,963,367
METHOD AND APPARATUS FOR PROCESSING CHOCOLATE AND THE LIKE
Filed Feb. 16, 1959  3 Sheets-Sheet 1

Inventor
A. Sollich

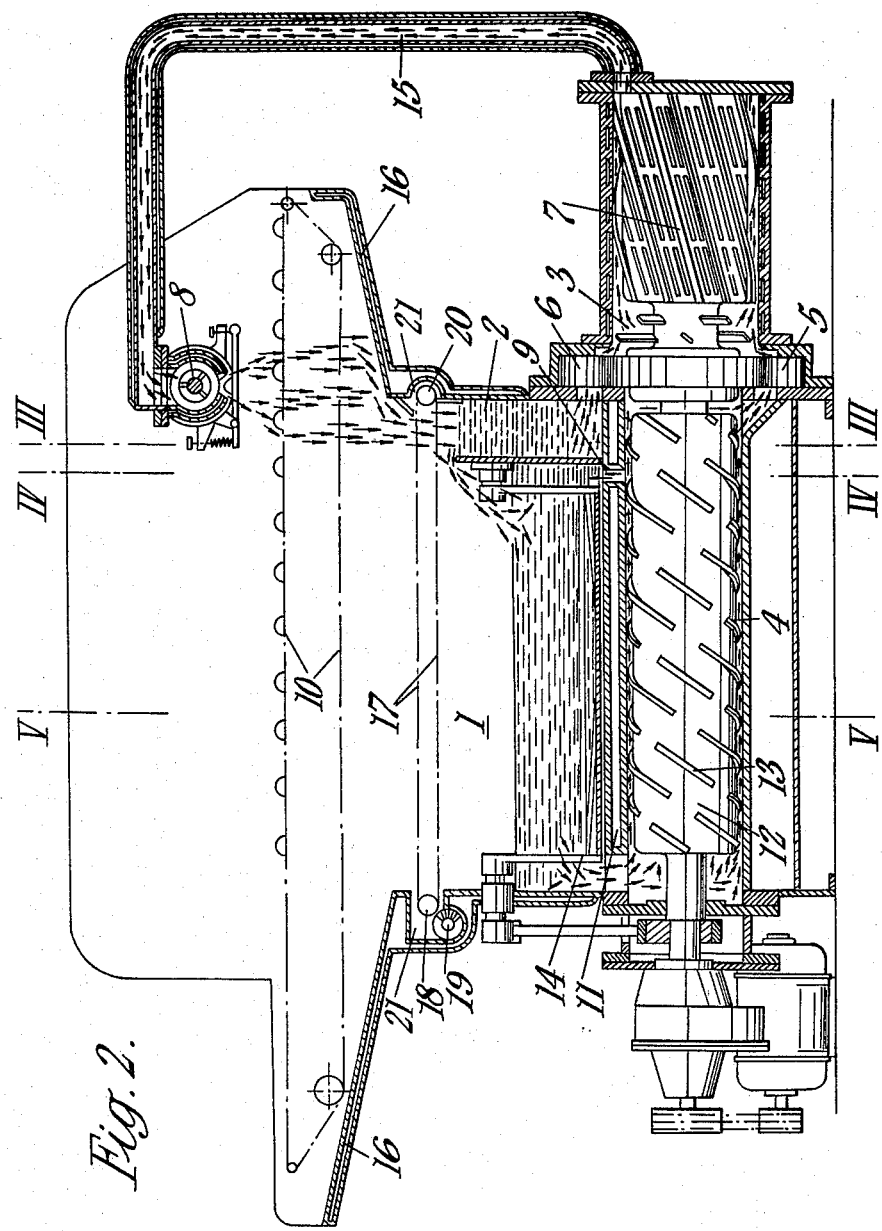

United States Patent Office 2,963,367
Patented Dec. 6, 1960

2,963,367

METHOD AND APPARATUS FOR PROCESSING CHOCOLATE AND THE LIKE

Robert Sollich, 10 Volkhausenstrasse, Bad Salzuflen, Germany

Filed Feb. 16, 1959, Ser. No. 793,532

Claims priority, application Germany Feb. 25, 1958

6 Claims. (Cl. 99—23)

It is known that chocolate or similar fat-containing substances (hereinafter referred to as chocolate) must in their ultimate treatment be in a tempered state if the goods made therefrom are to satisfy high requirements as regards quality. This tempered state of a batch of chocolate, intended for instance for coating cakes or centres of chocolates, is not attained merely by maintaining a predetermined tempering temperature, since the material must also be in a state of incipient crystallisation of the fatty constituents. Since the number of fat-crystal nuclei present in the material, even at the tempering temperature, cannot from its very nature be kept constant, it is not possible to keep a batch of chocolate tempered for any length of time. On the contrary, crystallisation continually progresses, so that the chocolate passes into an over-tempered state, in which it only admits of being made into a product of relatively low quality. In the case of an enrobing machine working with surplus delivery, in which the surplus tempered chocolate is fed back to the machine, the risk of the circulated chocolate becoming over-tempered is particularly great.

Efforts have been made to overcome the difficulties described, one known measure being the so-called "run-in tempering" or "drip-feed" process. In this process untempered chocolate is continuously added to the tempered supply in the supply tank of an enrober, this being done to the extent to which the tempered chocolate is used up for coating the articles. This is intended to result in the untempered chocolate, admitted to the supply tank and mixed with the tempered chocolate therein, becoming itself fully tempered, while at the same time the tempered chocolate in the supply tank is prevented from passing into the over-tempered state, so that the chocolate conveyed out of the supply tank for use is always uniformly tempered. This process may be theoretically correct, but considerable difficulties hinder it from being carried out in practice, particularly when the ratio of returned surplus chocolate to the utilised chocolate, which ratio in enrobers may be above 6:1, is unfavourable.

The present invention is concerned with the problem of obviating the above disadvantages and enabling further advantages to be obtained.

The invention consists in a process for obtaining tempered chocolate at the operative point of a chocolate enrobing, bottoming or moulding machine working with surplus delivery of tempered chocolate which is fed back to the machine, wherein continually the surplus tempered chocolate $c$ is divided into two portions $d$ and $e$, portion $e$ being delivered to and mixed with a stock of untempered chocolate $b$, and a portion $a$ from the stock $b$ is mixed with the portion $d$ of tempered chocolate divided from the surplus chocolate $c$ and the mixture $a$ and $d$ tempered and delivered to the operating point, the stock of untempered chocolate $b$ being replenished by a make-up supply $f$.

This process renders it possible to obtain with certainty uniform, tempered chocolate at the operative point of the machine. In doing so the make-up chocolate $f$ may be added to the stock $b$ in a tempered, untempered or over-tempered state, or even in the form of blocks, both continuously or in batches.

Although the behaviour of chocolate and similar fat-containing materials during tempering is physically not well understood, it is known that the above-mentioned fat-crystal nuclei occur in four modifications. These are referred to as the gamma form, the alpha form, the beta-I form and the beta form. The solidification temperature of the beta form is about 34° C., while the solidification temperatures of the other forms are lower, in the order given. It has been found that the presence of seed nuclei of the beta form is of decisive importance for the attainment of good products, and that the presence of the beta-I form is not deleterious. If however seed nuclei of the gamma and alpha forms, of lower melting point, are present in the tempered chocolate, the products are of substantially lower quality, and above all have a lustreless appearance.

The invention further consists in a process for obtaining tempered chocolate as set out above in which the mixture of the untempered portions $a$ and the tempered portion $d$ is brought to a temperature which is such that the mixture $a$ and $d$ contains seed nuclei only of the beta form, or possibly those of the beta-I form also, but not of the gamma or alpha form. This is obtained primarily by a suitable mixing ratio of the portions $a$ and $d$, and secondarily by supplementary heating of the untempered chocolate $a$ before mixing with the tempered chocolate $d$.

For carrying out the process an enrobing, bottoming or moulding machine having, in a manner known in itself, a collecting and storage receptacle comprising a supply tank, and with a chocolate delivery device or devices arranged above the latter and over and/or under a reticulated article-conveying band, is provided with, according to the invention, additional to the supply tank, to which the replenishing make-up chocolate $f$ and the portion $e$ of the surplus chocolate $c$ are supplied, an open-topped vessel which intercepts the portion $d$ of the surplus chocolate $c$ and supplies it through an outlet at the bottom of the vessel to a mixing chamber, a temperature-raising chamber connected to the outlet of the supply tank, adjustable feeding elements, which, independently of one another, supply to a mixing chamber metered portions, both of the untempered chocolate $a$ passing through the temperature-raising chamber and of the tempered portion $d$ of the surplus chocolate $c$, the mixture of $a$ and $d$ then being passed, through a cooling device if necessary, to the delivery devices.

Further features of the process according to the invention, and of an enrobing machine working according to this process, will now be more fully described with reference to a flow diagram and to a constructional example of the machine according to the invention, in the accompanying drawings, in which:

Figure 2 shows in longitudinal section an enrobing machine according to the invention.

Figure 1:
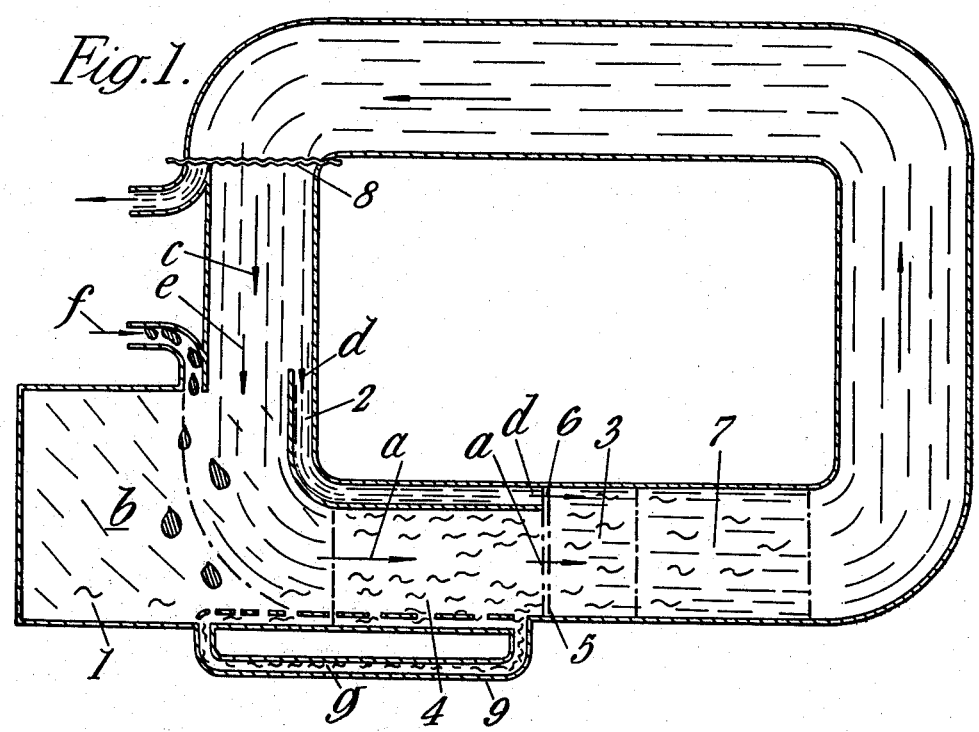
Figure 1 is a flow diagram of the process according to the invention.

In the process, according to the invention, a portion $a$ of chocolate kept in an untempered state in store $b$ is continuously fed from the store $b$ and mixed with a tempered portion $d$ originating directly from surplus chocolate $c$ from the delivery device 8 and the mixture $a+d$ tempered and fed to the delivery device. The surplus tempered chocolate $c$ is divided into two portions $d$ and $e$ as mentioned above, which latter is supplied to the store $b$, which is further supplemented by replenishing chocolate $f$.

In this flow diagram, the positions of the most important parts of an enrobing machine are marked with arabic numerals. The store b, which is supplemented by the replenishing chocolate f and the portion e, is located in a collecting and storage receptacle comprising a supply tank 1, adjacent which a throughpass container 2 is arranged, which supplies to a mixing chamber 3 the portion d originating directly from the surplus chocolate c. The supply tank 1 is followed by a temperature-raising chamber 4, which brings the portion a into an untempered state and supplies it to the mixing chamber 3. Between the chamber 4 and the mixing chamber 3 are arranged adjustable feeding elements 5 and 6, which, independently of one another, supply predetermined quantities of the untempered chocolate a and of the tempered portion d respectively to the mixing chamber 3. The mixture a+d after passing if desired through a cooling device 7, is supplied to the delivery device 8. The end of the temperature-raising chamber 4 adjacent the mixing chamber 3 communicates by a pressure-equalising pipe 9 with the supply tank 1, so that any excess of untempered portion g originating from the portion a in the chamber 4 is carried back to the store b.

Figure 2 shows in longitudinal section an enrobing machine, according to the invention, which consists, as in ordinary enrobing machines, of a supply tank 1, and a delivery device 8 arranged thereabove over an endless article-conveying band 10. While not shown a bottoming feed device may be substituted or also be incorporated to apply a coating of chocolate to the under-surfaces of the goods in known manner. Adjacent the supply tank 1 is arranged an open throughpass container 2, which intercepts a part of the surplus chocolate c from the delivery device 8 and supplies it to the mixing chamber 3. The supply tank 1 communicates with a temperature-raising chamber 4, which, separated only by a heating jacket 11, is arranged directly underneath the supply tank 1. The temperature-raising chamber 4 contains a worm or like helical conveyor 12, which, in order to provide good heat exchange, works with a narrow gap, and which preferably has interrupted worm threads 13 for the purpose of thoroughly mixing the chocolate in the temperature-raising chamber 4. The worm conveyor 12 passes the chocolate through the temperature-raising chamber 4 to the mixing chamber 3. In the end region and at the highest point of the temperature-raising chamber 4 is arranged a pressure-equalising pipe 9, which connects that end of the temperature-raising chamber 4 with the supply tank 1 for the purpose of returning any excess g of untempered chocolate a to the supply tank 1. A further effect of the provision of the pressure-equalising pipe 9 is that bubbles of air or vapour trapped in the portion a, which only become movable at the higher temperature at the end of the temperature-raising chamber 4 owing to the reduction in the viscosity of the chocolate, can escape by ascending the pipe 9 and so pass out to the supply tank 1 which the returned excess chocolate g. A paddle 14 is movable to and fro in the supply tank 1, which is trough-shaped in section, the paddle 14 extending in the longitudinal direction of the trough of the supply tank 1, and thereby assists the ascent of the air and vapour bubbles. Between the temperature-raising chamber 4 and the mixing chamber 3, and also between the throughpass container 2 and the mixing chamber 3, are arranged adjustable feeding elements 5 and 6, which, independently of one another, supply to the mixing chamber 3 selected proportions respectively of the untempered chocolate a passing through the temperature-raising chamber 4 and also of the tempered portion d of the surplus chocolate c from the delivery device 8 intercepted by the container 2. The mixing chamber 3 is followed by an ordinary cooling device 7, in which the mixture is tempered, and from which it is supplied, freshly tempered, through a pipe line 15, to the delivery device 8.

The article-conveying band 10 located underneath the delivery device 8 is in its longitudinal extent greater than that of the supply tank 1 and through-pass container 2. Beneath the parts of the article-conveying band 10 that project beyond the two containers 1 and 2 are arranged catch-plates 16, which guide the chocolate dripping off the articles back into the containers 1 and 2.

The supply tank 1, the through-pass container 2, the mixing chamber 3, the temperature-raising chamber 4, the cooling device 7, the pipe 15, the delivery device 8 and the catch-plates 16 are at least partly jacketed, so that the temperature of these parts can be regulated by means of a medium, for instance steam or water, flowing through between the jacket walls.

In order that no disturbances may occur in the conveyance of the chocolate in circulation, foreign bodies, such as sugar crystals for example, or high-melting fats, or cake crumbs, must be prevented from getting into the various feeding devices of the enrobing or bottoming machine. This result is attained, in an enrobing or bottoming machine, according to a further development of the invention, by arranging, above the supply tank 1 and the through-pass container 2, a revolving sieve or strainer 17. By the passing of the sieve or strainer 17 round a return pulley 18, the foreign bodies retained thereon are delivered to a worm conveyor 19, which is arranged parallel to the axis of the return pulley 18, and which removes the foreign bodies. The deflecting pulley 18 and its counterpart pulley 20, of the sieve or strainer 17 are preferably arranged in niches 21, located underneath the catch-plates 16.

Figure 3:
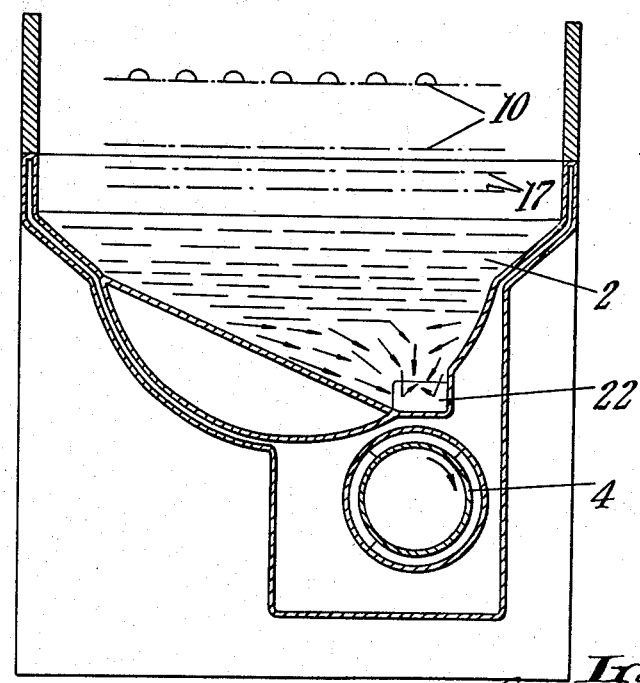
Figures 3, 4 and 5 show sections on the lines III—III, IV—IV and V—V respectively in Figure 2.

Figure 3 shows a cross section of the enrobing machine, according to the invention, on the section line III—III in Figure 2, which passes substantially through the through-pass container 2 and the temperature-raising chamber 4 and which shows at 22 the discharge aperture of the container 2 to the feeding element 6.

Figure 4:
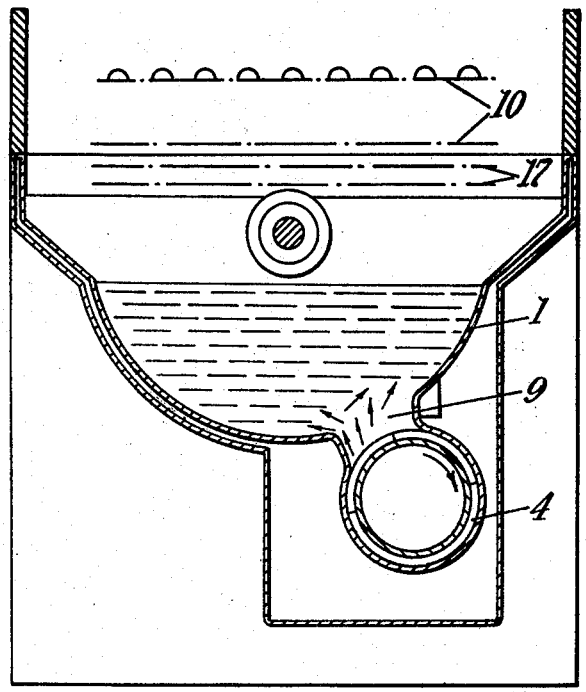
Figure 5:
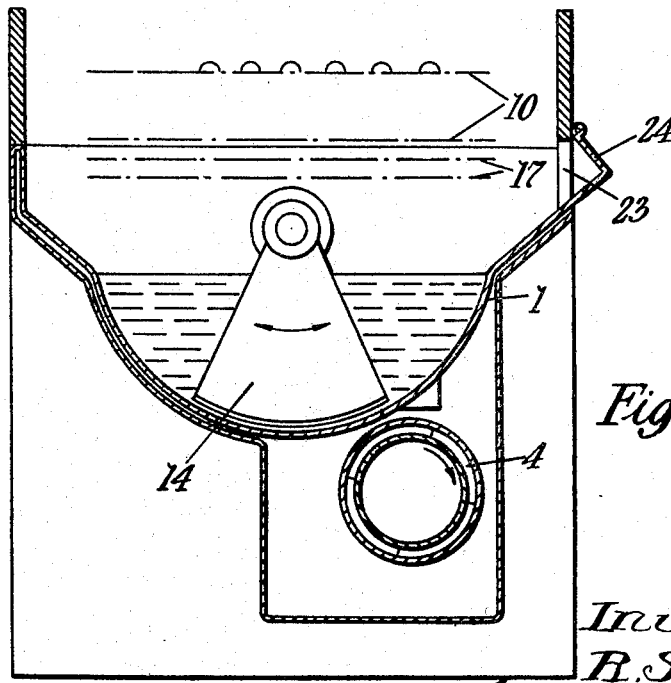

Figures 4 and 5 show cross sections on the section lines IV—IV and V—V in Figure 2, which pass substantially through the supply tank 1 and the temperature-raising chamber 4. In Figure 4 the pressure-equalising pipe 9, which connects the chamber 4 with the supply tank 1, is shown in section. In Figure 5 the arrangement of the reciprocating paddle 14 in the trough-shaped supply tank 1 is shown, while a filling aperture 23 is provided for charging the supply tank 1 and has a closure 24.

I claim:

1. A process for continuously tempering chocolate for use in the production of sweetmeats wherein an excess of tempered chocolate, having fat-crystal nuclei of substantially only the beta form, is delivered to a production or treatment station and the surplus tempered chocolate recovered, comprising providing a stock of untempered chocolate, from which a supply of uninterrupted chocolate may be continuously withdrawn, dividing the surplus tempered chocolate recovered from the production or treatment station, into a first portion and a second portion, mixing said second portion with the untempered chocolate stock, continuously withdrawing a supply of untempered chocolate from said stock, heating said withdrawn supply of untempered cholocate to a temperature at which the fat-crystal nuclei in the chocolate are substantially only of the beta form mixing said first portion of recovered surplus tempered cholocate with said heated supply of untempered chocolate withdrawn from the untempered chocolate stock to provide a mixture thereof, cooling the mixture so that the chocolate becomes tempered and delivering the tempered chocolate to the production or treatment station at a quantity rate in excess of that required for the production or treatment of the sweetmeats in production.

2. A process for continuously tempering chocolate for use in the production of sweetmeats wherein an excess of tempered chocolate, having fat-crystal nuclei of substantially on the beta and beta-I forms, is delivered to a production or treatment station and the surplus tempered chocolate recovered, comprising providing a stock of untempered chocolate, from which a supply of untempered chocolate may be continuously withdrawn, dividing the surplus tempered chocolate recovered from the production or treatment station, into a first portion and a second portion, mixing said second portion with the untempered chocolate stock, continuously withdrawing a supply of untempered chocolate from said stock, heating said withdrawn supply of untempered chocolate to a temperature at which the fat-crystal nuclei in the chocolate are substantially only of the beta and beta-I forms, mixing said first portion of recovered surplus tempered chocolate with said heated supply of untempered chocolate withdrawn from the untempered chocolate stock to provide a mixture thereof, cooling the mixture so that the chocolate becomes tempered and delivering the tempered chocolate to the production or treatment station at a quantity rate in excess of that required for the production or treatment of the sweetmeats in production.

3. A process for continuously tempering chocolate according to claim 1, wherein a small proportion of the supply of untempered chocolate withdrawn from said stock is returned to said stock prior to the rest of said withdrawn supply of untempered chocolate being mixed with said first portion of the surplus tempered chocolate.

4. Apparatus for continuously tempering chocolate for use in association with sweetmeat producing or treatment machines of the character set forth comprising a tempered chocolate delivery device from which an excess of tempered chocolate is delivered, a skeletal surface for supporting said sweetmeats adjacent said chocolate delivery device, an open receptacle located below said chocolate delivery device and said skeletal surface and positioned to receive a proportion of said surplus tempered chocolate draining from said skeletal surface, an open-topped vessel adjacent said open-topped receptacle and also below said chocolate delivery device and skeletal surface positioned to receive the balance of said surplus tempered chocolate draining from said skeletal surface and to segregate it from the chocolate in said open receptacle, an outlet at the bottom of said open receptacle, an outlet at the bottom of said open-topped vessel, conduit means leading from the outlet from said open receptacle to adjacent the outlet from said open-topped vessel, heating means associated with the conduit means to heat the chocolate passing therethrough, a mixing chamber at the end of said conduit means and at the outlet from said open-topped vessel, means associated with the end of said conduit means and with the outlet from said open-topped vessel for metering the flow of chocolate from the conduit means and from the open-topped vessel, movable mixing means in said mixing chamber, a chamber having cooling means in communication with said mixing chamber to cool and temper the chocolate mixture received therefrom and conduit means leading from said cooling means chamber to said chocolate delivery device.

5. Apparatus for continuously tempering chocolate according to claim 4, wherein the conduit means leading from the outlet of the open receptacle and the heating means associated therewith are located below and substantially coextensive with said open receptacle.

6. Apparatus for continuously tempering chocolate according to claim 4, wherein the conduit means leading from the outlet of the open receptacle has, at its highest point and adjacent its end remote from said receptacle outlet, a small bore pipe connecting the conduit means to the receptacle.

References Cited in the file of this patent

UNITED STATES PATENTS

| | | |
|---|---|---|
| 2,023,741 | Moir | Dec. 10, 1935 |
| 2,313,705 | Jack | Mar. 9, 1943 |
| 2,784,095 | Meagher et al. | Mar. 5, 1957 |